(12) United States Patent
Tiesler et al.

(10) Patent No.: US 7,188,863 B2
(45) Date of Patent: Mar. 13, 2007

(54) MODULAR TRIM ASSEMBLY WITH AIR CURTAIN FOR A MOTOR VEHICLE

(75) Inventors: John M Tiesler, Harrison Township, MI (US); Michael C Dykman, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 71 days.

(21) Appl. No.: 10/908,561

(22) Filed: May 17, 2005

(65) Prior Publication Data

US 2006/0261580 A1 Nov. 23, 2006

(51) Int. Cl.
*B60R 21/16* (2006.01)

(52) U.S. Cl. .................................. 280/730.2

(58) Field of Classification Search ............. 280/730.1, 280/730.2, 728.2
See application file for complete search history.

(56) References Cited

U.S. PATENT DOCUMENTS

| | | | |
|---|---|---|---|
| 5,564,735 A | 10/1996 | Boy et al. | |
| 6,102,435 A | 8/2000 | Wallner et al. | |
| 6,189,961 B1 | 2/2001 | Poliskie et al. | |
| 6,198,409 B1 | 3/2001 | Schofield et al. | |
| 6,502,855 B1 | 1/2003 | Greiner et al. | |
| 2005/0029780 A1 | 2/2005 | Tanase | |

OTHER PUBLICATIONS

Peter Gardiner (Examiner); Combined Search and Examination Report under Section 17 & 18(3) issued for counterpart UK Patent Application No. 0609752.1; dated Jul. 14, 2006; 3 pages; The UK Patent Office.

*Primary Examiner*—Faye M. Fleming
(74) *Attorney, Agent, or Firm*—Wood, Herron & Evans, L.L.P.

(57) ABSTRACT

A side garnish molding assembly for use in a motor vehicle is provided which includes inner and outer panels and a partition extending between and integral with the inner and outer panels. The assembly also includes an air curtain cavity defined by the partition in combination with the inner and outer panels and at least one deployable air curtain disposed in the cavity.

19 Claims, 5 Drawing Sheets

MODULAR TRIM ASSEMBLY WITH AIR CURTAIN FOR A MOTOR VEHICLE

FIELD OF THE INVENTION

The present invention relates to trim assemblies for the interior of motor vehicles, and more particularly, to a modular side garnish molding assembly incorporating one or more air curtains.

BACKGROUND OF THE INVENTION

Side mounted air curtain assemblies are known in the automotive art and are designed primarily to keep occupants within a motor vehicle during a rollover event. Such air curtain assemblies have found particular application in certain vehicles, such as sport utility vehicles, known to experience rollovers.

One known air curtain assembly comprises an elongated plastic box containing an air manifold and air curtain within the box. Typically a vehicle has two such assemblies, one mounted on each side, with each assembly extending longitudinally between the front and rear ends of the vehicle. With known assemblies of this type, the box is attached directly to a sheet metal structure of the vehicle via a plurality of mount brackets and associated fasteners. The fasteners extend through holes in the brackets and are torqued directly to the sheet metal structure of the vehicle.

Air curtain assemblies of this type also include a source of gas to inflate the air curtain, typically comprising pellets of various solids known in the art, housed in a canister. When a sensor, typically mounted within the instrument panel of the vehicle, senses vehicle side loads indicating that a rollover condition is imminent, an electric charge is sent to the canister that vaporizes the pellets within the canister. The resulting gas inflates the air curtain(s) and causes the curtain(s) to deploy downwardly, typically with one curtain over each window on the corresponding side of the vehicle.

Air curtain assemblies of this type are subject to certain disadvantages. For example, in addition to the need for torqued fasteners to react the deployment force when the air curtain(s) deploy, additional torqued fasteners are typically required to force the elongated box to conform to the shape of the vehicle trim as they are typically shaped to fit the vehicle body.

Additionally, the assembly of the air curtain assembly to the sheet metal structure of the vehicle, with the required torquing of a multitude of fasteners, and the subsequent installation of the interior trim over the corresponding interior portion of the vehicle, are done using a sequential, layered approach, as opposed to a modular approach. This adds cost to the assembly process and may lengthen the assembly line due to the time required by these layered tasks in combination with the required line speed. If the assembly line must be lengthened, the potential plant capacity can be reduced. Also, torquing of the required fasteners to install the air curtain assembly to the sheet metal structure of the vehicle typically requires one or more assemblers to enter the vehicle as it is moving down the assembly line which is undesirable.

Another safety measure that can be incorporated in existing vehicles is a head-impact-countermeasure structure in the interior of the vehicle that is designed to slow the velocity of an occupants' head upon impact with this structure during a crash situation. Known head-impact-countermeasure structures can assume a variety of configurations, but all are believed to be separate from any side curtain assembly, requiring separate assembly that can also add to the overall assembly time for the vehicle.

In view of the foregoing, there is a need for an improved air curtain assembly as well as the associated trim assembly for motor vehicles.

SUMMARY OF THE INVENTION

Accordingly, the present invention provides a side garnish molding assembly for use in a motor vehicle comprising an inner panel, an outer panel and a partition that extends between and is integral with the inner and outer panels. The assembly further includes an air curtain cavity defined by the partition in combination with the inner and outer panels. At least one deployable air curtain is disposed within the air curtain cavity.

BRIEF DESCRIPTION OF THE DRAWINGS

These and other features, aspects and advantages of the present invention will become better understood with regard to the following description, appended claims and accompanying drawings wherein:

DETAILED DESCRIPTION

Figure 1:
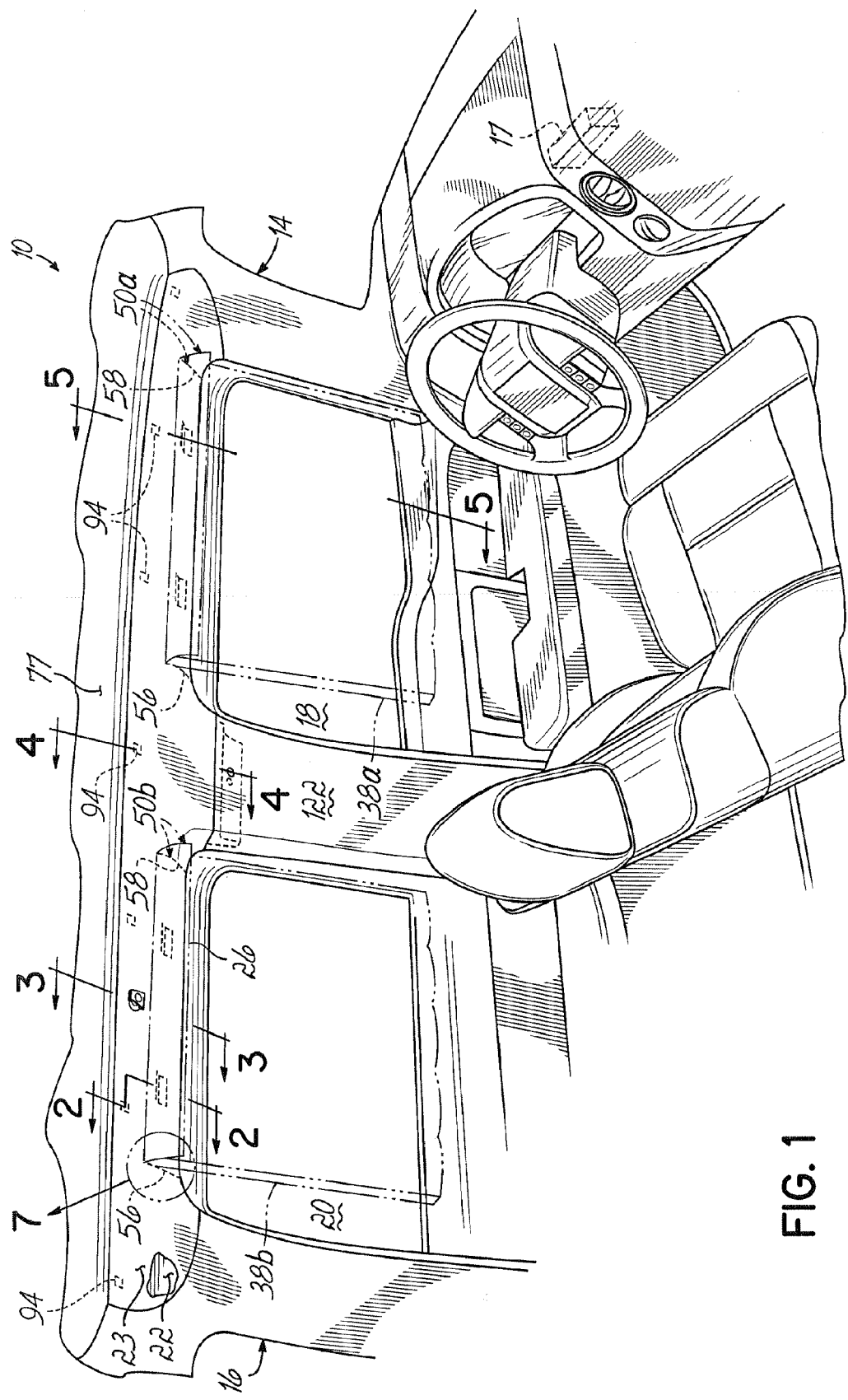
FIG. 1 is a perspective view partially in cut-away, of a portion of an interior of a motor vehicle incorporating a side garnish molding assembly according to one embodiment of the present invention.

Referring now to the drawings, FIG. 1 is a perspective view, partially in cut-away, of a portion of an interior of a motor vehicle incorporating a side garnish molding assembly 10 according to one embodiment of the present invention. As best seen in the cross-sectional views illustrated in FIGS. 2–5, the side garnish molding assembly 10 is mounted to a metal structure, indicated generally at 12, of the motor vehicle as subsequently discussed in greater detail. The molding assembly 10 extends longitudinally from a front portion 14 of the motor vehicle to a rear portion 16 of the motor vehicle and is disposed above a front side window 18 and a second row side window 20 during normal usage as shown in FIG. 1. In some motor vehicles, the second row side window 20 can be a rear side window.

The side garnish molding assembly 10 includes an inner panel 22 that extends throughout the longitudinal extent of assembly 10. The inner panel 22 includes an upper portion, indicated generally at 24 and a lower portion, indicated generally at 26. Assembly 10 also includes an outer panel 28 which is integral with the upper portion 24 of inner panel 22 and is in contacting engagement with the lower portion 26 under normal use, when the included air curtain (subsequently discussed) is stowed and not deployed. Under normal use (i.e., no air curtains deployed), the outer panel 28 is spaced apart from the inner panel 22 between the upper portion 24 and lower portion 26 of inner panel 22 as may be appreciated from FIGS. 2–4. A partition 30 extends between inner panel 22 and outer panel 28 and is integral with both of the panels 22, 28.

The assembly 10 includes an upper, head-impact-countermeasure cavity 32 and a lower, air curtain cavity 34. The upper 32 and lower 34 cavities are defined by the partition 30, inner panel 22 and outer panel 28.

Molding assembly 10 includes an air curtain assembly 36 disposed in the air curtain cavity 34. Each air curtain assembly can include two or more deployable air curtains, with the illustrative embodiment including air curtains 38a and 38b in each air curtain assembly. Air curtains 38a and 38b are in fluid communication with an air manifold 40.

Figure 2:
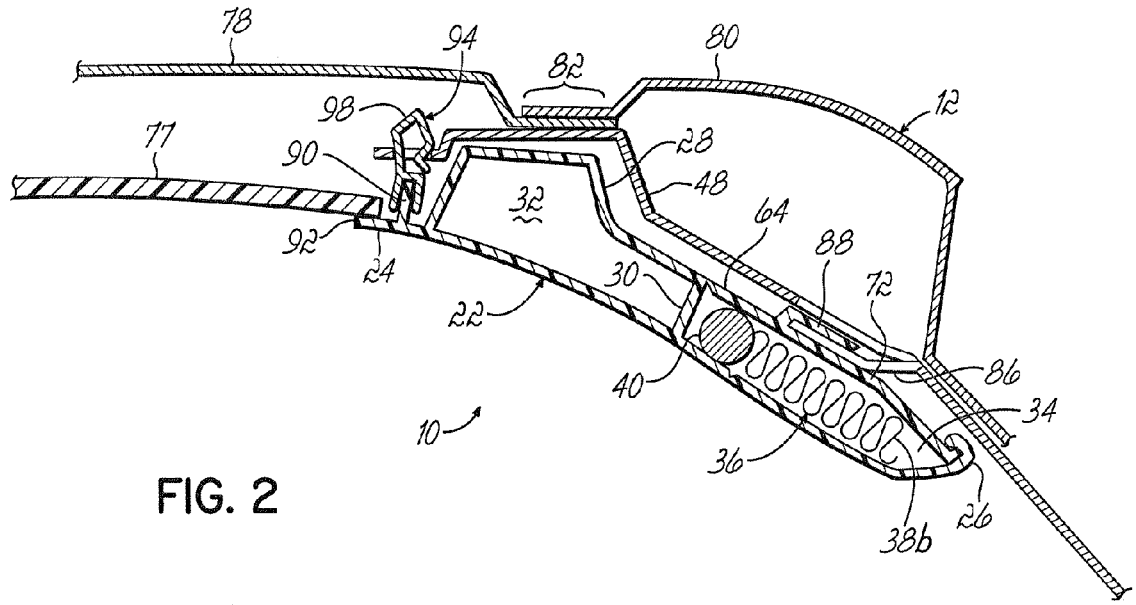
FIG. 2 is a cross-sectional view taken along line 2—2 in FIG. 1.
Figure 3:
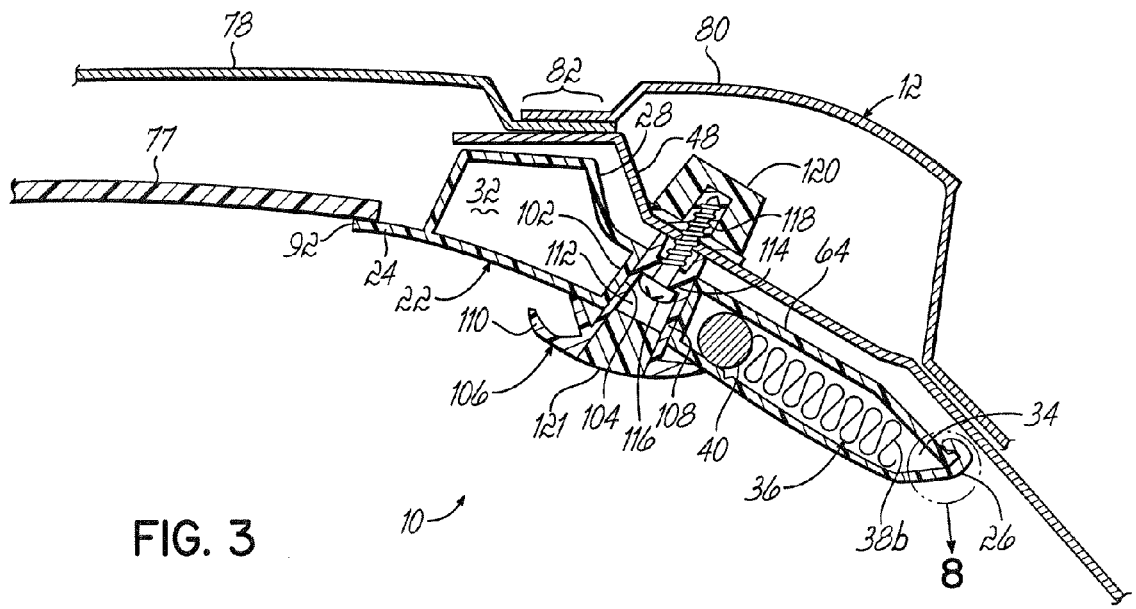
FIG. 3 is a cross-sectional view taken along line 3—3 in FIG. 1.
Figure 5:
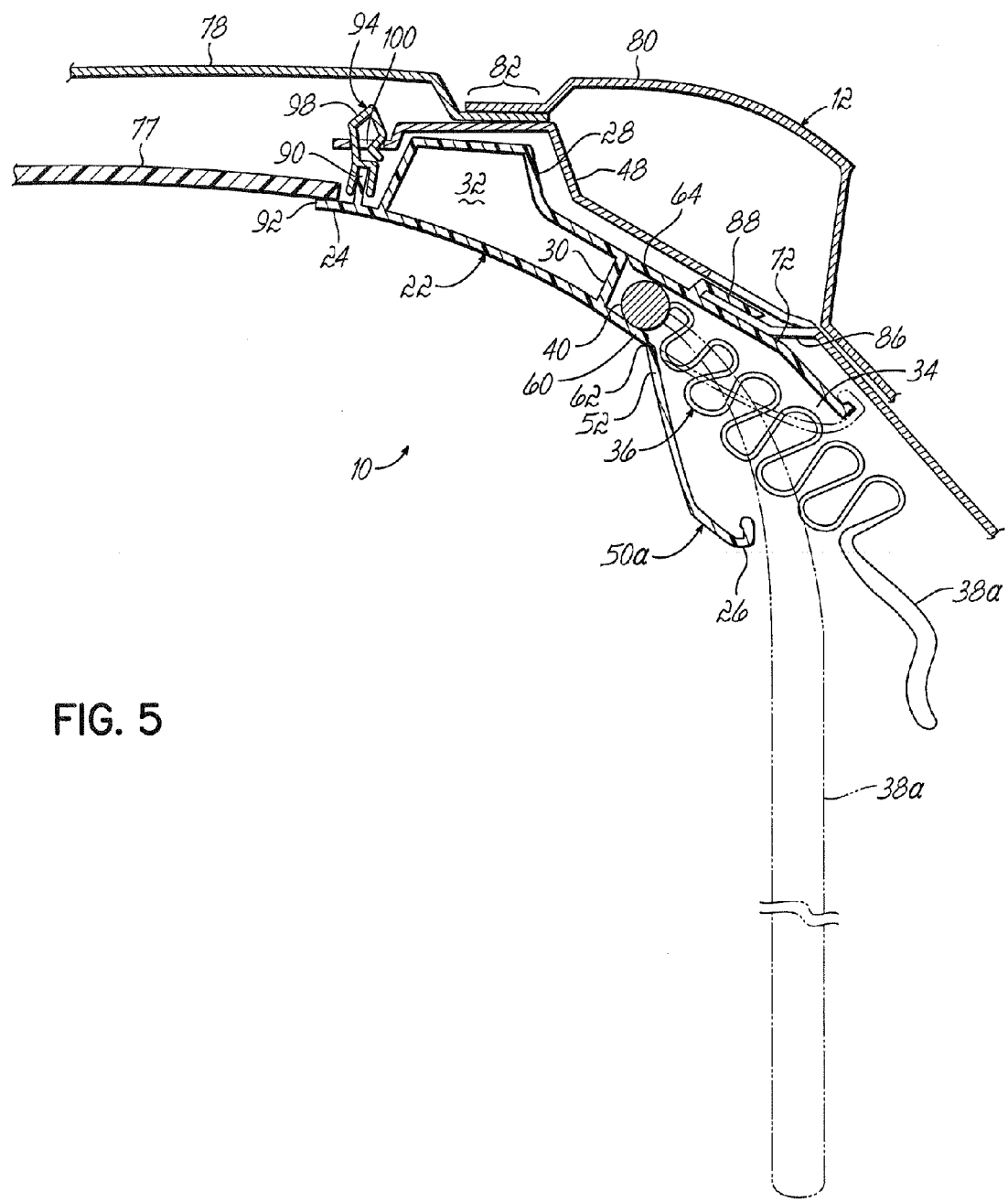
FIG. 5 is a cross-sectional view taken along line 5—5 in FIG. 1.

The cross-sectional views illustrated in FIGS. 2 and 3 show a rear air curtain 38b in a stowed position. In contrast, the cross-sectional view illustrated in FIG. 5 shows a forward air curtain 38a starting to deploy, as illustrated in solid lines, and in a fully deployed position as indicated in phantom lines.

The air curtain assembly 36 further includes a canister 42 which houses a source of gas used to inflate each of the air curtains 38a and 38b. Canister 42 is in fluid communication with the air manifold 40 via at least one connector conduit 44, shown in FIG. 4. In the illustrative embodiment, canister 42 is located under a locally depressed portion 46 of a side rail member 48 of a side frame assembly of the motor vehicle. However, it should be understood that canister 42 can be located in a variety of other locations within the motor vehicle. In the illustrative embodiment, the connecting conduit 44 passes through an opening in the outer panel 28 and is attached to air manifold 40 in a manner that provides fluid communication between the manifold 40 and canister 42 via connecting member 44. The air curtain assembly can include one or more straps (not shown) that engage manifold 40 and are then secured to inner panel 22 by conventional fasteners (not shown). Alternatively, air curtains 38a and 38b can be disposed within plastic cases (not shown) that are secured to inner panel 22 by conventional fasteners. In this event, the cases are forced open upon the deployment of the air curtains 38a and 38b. It is conceivable that manifold 40 and air curtains 38a and 38b can be otherwise secured within air cavity 34.

The inner panel 22 of assembly 10 includes two deployment portions indicated generally at 50a and 50b in FIG. 1. Deployment portion 50a is generally longitudinally aligned with forward air curtain 38a and deployment portion 50b is generally longitudinally aligned with rear air curtain 38b. Each deployment portion 50 of inner panel 22 is operably effective for pivoting open away from the outer panel 28 when the corresponding and generally aligned one of the air curtains 38 is deployed, as shown in FIG. 5. Referring to FIGS. 1 and 5, each deployment portion 50 of inner panel 22 includes an upper, proximal side 52, and lower distal side corresponding to the lower portion 26 of inner panel 22 within the deployment portion 50. The deployment portion 50 also includes first 56 and second 58 ends that are longitudinally spaced from one another as shown in FIG. 1.

The inner panel 22 includes a substrate material that is formed from one of the following materials: thermoplastic olefin (TPO); polypropylene and any derivative thereof; or other suitable material. Since the inner panel 22 faces the interior of the motor vehicle in which it is used, the panel 22 also includes a cover 23 (shown in FIG. 1) made of a conventional cover stock material such as a formable textile that is integral with the substrate of panel 22. The cover 23 faces the interior of the motor vehicle as shown in FIG. 1. For purposes of illustration, the cover 23 is not shown in the cross-sectional views illustrated in FIGS. 2–6.

In the illustrative embodiment, the substrate of inner panel 22, outer panel 28 and partition 30 are made as a unitary construction of the same material, i.e., thermoplastic olefin (TPO), polypropylene or a derivative thereof; or other suitable thermoplastic material. However, as may be appreciated, the outer panel 28 and partition 30 do not include a cover as they are not viewable from the interior of the vehicle during normal use, i.e., when the air curtains 38a and 38b are not deployed. Outer panel 28, partition 30 and the substrate of inner panel 22 can be formed by a blow molding or injection molding process. The cover 23 can be formed using a vacuum forming process and then becomes integral with the substrate of inner panel 22 during the blow molding or injection molding process.

Figure 7:
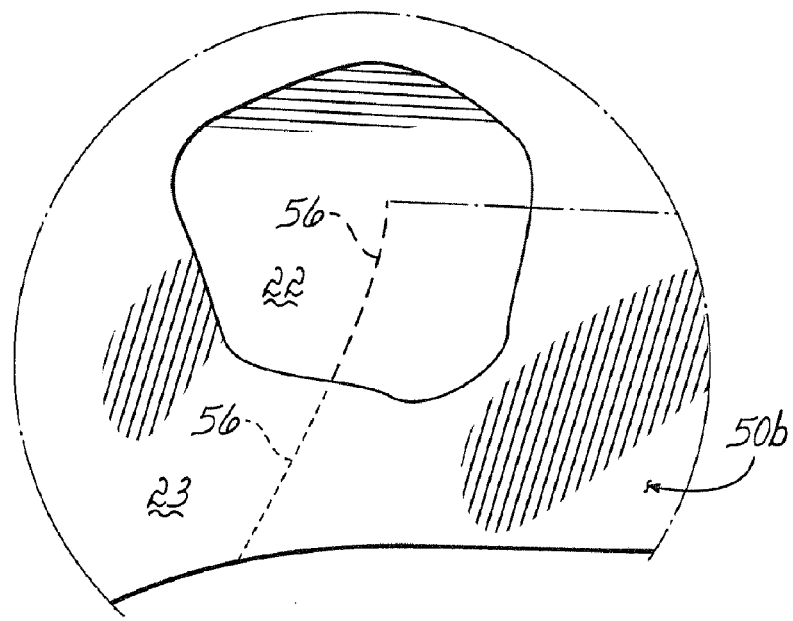
FIG. 7 is an enlarged view, partially in cut-away, of the circled area 7 in FIG. 1.

As shown in FIG. 7, which is a fragmentary view, partially in cut-away, of a portion of FIG. 1, score lines are formed in the substrate material of the inner panel 22 at the ends 56, 58 of the deployment portions 50, to facilitate the opening of each deployment portion 50 when a corresponding air curtain 38 is deployed. The proximal side 52 of the deployment portion 50 of inner panel 22 is hingedly connected to an adjacent portion, indicated at 60, of inner panel 22 via a hinge 62. Use of a blow molding process in the illustrative embodiment, allows hinge 62 to be a living hinge, as may be appreciated by one skilled in the art. During deployment of air curtain 38, the deployment portion 50 of inner panel 22 pivots about the hinge 62 away from the outer panel 28.

Figure 8:
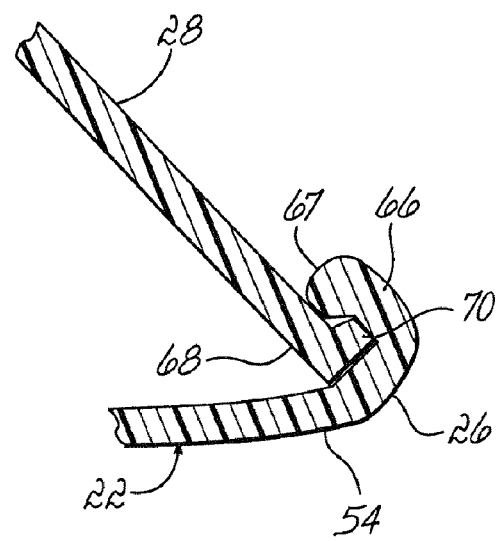
FIG. 8 is an enlarged view of the circled area 8 shown in FIG. 3.

As may be appreciated from FIG. 2 and FIG. 5, the outer panel 28 includes a pair of deployment portions 64, with each of the portions 64 being generally aligned with one of the deployment portions 50 of the inner panel. As best seen in FIG. 8, the lower portion 26 of the inner panel 22 terminates in a hook 66 and a lower, distal side 68 of the outer panel 28 terminates in an outwardly extending flange 70 that is received within hook 66 so as to prevent the inner panel 22 from opening away from outer panel 28 under the normal force of gravity.

The motor vehicle can include a sensor (not shown) mounted in a control box 17 (schematically shown in phantom lines in FIG. 1) in the area of the instrument panel of the motor vehicle, or in another location, that is capable of detecting side loads on the motor vehicle. When side loads are detected indicating that rollover of the motor vehicle is imminent, an electric charge is sent via circuitry (not shown) to canister 42 that vaporizes the pellets within canister 42. The pellets within canister 42 can be made of sodium azide or a comparable material. The resulting gas passes through connecting conduit 44 into air manifold 40 and then into air curtains 38a and 38b, causing air curtains 38a and 38b to deploy. When the air curtains 38a and 38b are deployed, there is sufficient force exerted on the inner panel 22 by each of the air curtains 38a and 38b during the inflation and deployment of air curtains 38a and 38b, such that the hook 66 of inner panel 22 is disengaged from the flange 70 of outer panel 28, thereby allowing the panel 22 to pivot about the living hinge 62 away from the outer panel 28 in the deployment portions 50a and 50b. FIG. 5 shows the forward air curtain 38a in a partially deployed state in solid lines and in a fully deployed state in dashed lines. Hook 66 includes a rounded end 67 that is effective for preventing hook 66 from tearing air curtains 38a and 38b during deployment.

Figure 6:
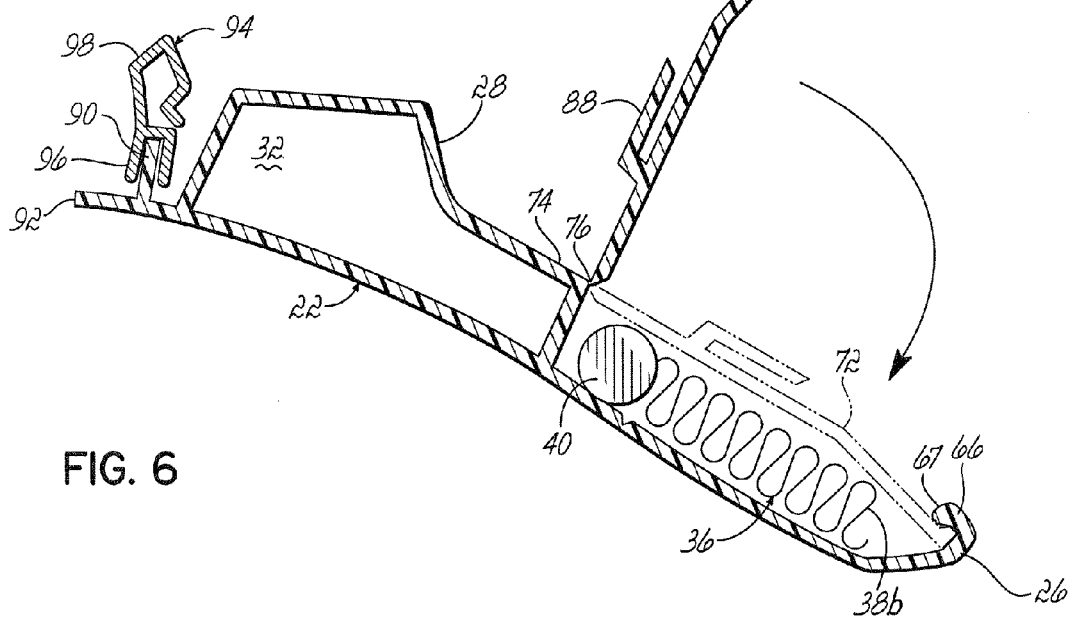
FIG. 6 is a cross-sectional view similar to that shown in FIG. 2 but prior to installation of the assembly of the present invention, and illustrating an access door.

The outer panel 28 includes at least one access door 72 formed therein for each air curtain 38. In the illustrative embodiment the outer panel 28 includes at least two access doors 72, with one being generally aligned with each of the air curtains 38a and 38b. Alternatively, a plurality of access doors 72 may be generally aligned with each of the air curtains 38a and 38b to facilitate installation of the air curtains 38a and 38b, depending on the particular shape of assembly 10 required to accommodate a particular vehicle. The access door 72 is connected to an adjacent portion 74 of outer panel 28 by a living hinge 76 as shown in FIG. 6. Accordingly, the access door 72 may pivot open about hinge 76 away from the inner panel 22 to permit the air manifold 40, connector conduit 44 (not shown in FIG. 6) and each of the air curtains 38a and 38b to be loaded into the lower air curtain cavity 34 prior to assembling the side molding assembly 10 to the sheet metal structure 12 of the motor vehicle.

The upper, head-impact-countermeasure cavity 32 can contain air therein or alternatively can be filled with foam (not shown) or other material (not shown) or can include ribs (not shown) extending between the inner panel 22 and the outer panel 28. The purpose of the head-impact-countermeasure cavity 32 and the portions of the inner panel 22 and outer panel 28, as well as partition 30, which define cavity 34, is to create a head-impact-countermeasure portion of assembly 10 to provide occupants of the motor vehicle with additional head protection during a crash event. The parameters associated with the head-impact-countermeasure cavity 34 and the associated structure of panels 22, 28 and partition 30 that define the countermeasure portion of side garnish mold assembly 10, are selected to ensure that assembly 10 has a sufficient design to meet auto industry safety standards regarding countermeasure areas, as determined by the HICd rating of this portion of assembly 10.

Referring now to FIG. 2–5, a portion of the metal structure 12 of the motor vehicle is illustrated. More particularly, structure 12 includes first 78 and second 80 portions of a sheet metal roof which are joined by conventional means, such as spot welding, at joint 82. Structure 12 also includes the side rail member 48 of a side frame assembly, discussed previously, that is connected to the roof portions 78, 80 at joint 82 by conventional means, such as spot welding. Side rail member 48 includes a plurality of longitudinally spaced hooks 86, (two of the hooks 86 are shown in FIGS. 2 and 5). The outer panel 28 of side garnish molding assembly 10 includes a plurality of longitudinally spaced hooks 88 that engage the hooks 86 of the side rail member 48 during the installation of the assembly 10 to the motor vehicle. Accordingly, there can advantageously be an equal number of hooks 86 and 88.

A plurality of longitudinally spaced and upwardly extending flanges 90 are integral with the upper portion 24 of inner panel 22 as shown in FIGS. 2 and 4–6. The flanges 90 are spaced apart from the outer panel 28 toward an upper edge 92 of the inner panel 22. Assembly 10 further includes a plurality of clips 94, that can be made of metal, with assembly 10 advantageously including a like number of clips 94 and flanges 90. Each of the clips 94 has an open end 96 in contacting, clamping engagement with one of the flanges 90. Each clip 94 also includes an opposite, substantially closed end 98, which is inserted through a mating aperture 100 formed in an upper end of the side rail member 48 of the side frame assembly of metal structure 12 of the motor vehicle. The closed end 98 of clip 94 is resilient or spring-like so that it is capable of collapsing somewhat to permit passage through aperture 100 and then expanding somewhat after passing through aperture 100, thereby retaining clip 94 in place.

The installation of assembly 10 can occur as follows as the motor vehicle moves down the assembly line. Initially, the hooks 88 of outer panel 28 are engaged with the hooks 86 of the side rail member 48 of the metal structure 12 of the motor vehicle. The assembly 10 can then be rotated toward the roof 78, 80 of the motor vehicle so that the clips 94 secured to flanges 90 of inner panel 22 can engage apertures 100 of the side rail 84 member 48. When this occurs, the upper portion 24 of panel 22 is pressed against a headliner 77 of the motor vehicle, retaining it in place. These operations can be done quickly and efficiently from a location on the assembly line exterior of the motor vehicle. Finally, the fasteners such as screws 118 and 126 are torqued.

The incorporation of the air curtains 38a and 38b within the lower air curtain cavity 34 and the upper head-impact-countermeasure cavity 32, as well as the use of hooks 84, flanges 90 and clips 94 to initially install the assembly 10 to the metal structure 12, provides a modular assembly 10 which is relatively easy to install.

It is necessary to incorporate sufficient torqued fasteners in assembly 10 to react the loads on assembly 10 created when the air curtains 38a and 38b deploy. Also, some local areas of the metal structure 12 are conducive to the use of torqued fasteners, such as the B-pillar 122 due to the structural strength of this area of the vehicle, and areas having special features such as coat hooks or hand assist grips. For instance, at the longitudinal position illustrated in FIG. 3, assembly 10 includes a bushing 102 extending between and integral with the inner 22 and outer 28 panels of assembly 10. The bushing 102 has a bore 104 formed therein. Assembly 10 can also include a hanger 106 having a shank portion 108 shaped for engagement with the bore 104 of bushing 102, and a head portion including at least one coat hook 110 disposed on the interior of the motor vehicle. The hanger 106 also includes an interior bore 112 extending partially therethrough and terminating in a land 114 that is suitable to accept a head 116 of a conventional fastener such as screw 118 that is threaded into a convention spring nut 120 secured to the side rail member 48 in a conventional manner as known in the art. After screw 118 is torqued, a plug 121 is inserted in the interior bore 112.

Figure 4:
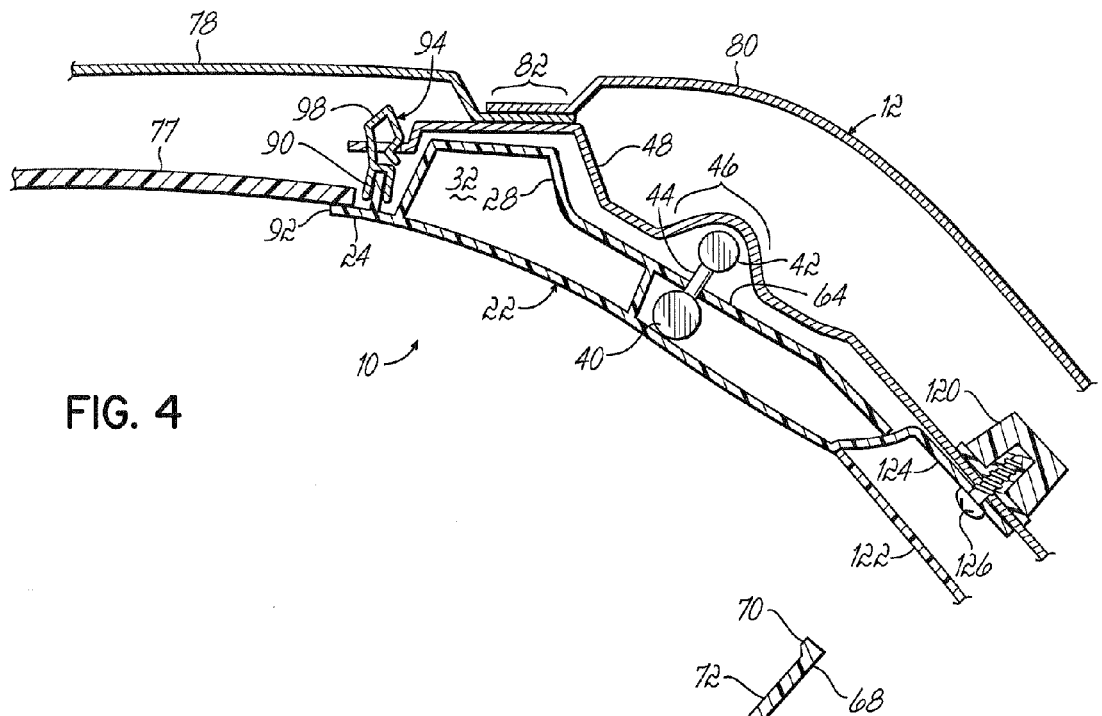
FIG. 4 is a cross-sectional view taken along line 4—4 in FIG. 1.

Another location where one or more torqued fasteners can be used to attach the assembly 10 to the metal structure 12 of the motor vehicle, is in the area of the B-pillar 122 of the motor vehicle, as shown in the cross-sectional view illustrated in FIG. 4. In this area, the inner panel 22 includes a lower extension 124 that is secured to the side rail member 48 by conventional fasteners such as screw 126 and spring nut 120.

Notwithstanding the use of the torqued fasteners 116 and 126 in local areas of molding assembly 10, significantly fewer torqued fasteners are used to attach assembly 10 to structure 12 than the typical number of torqued fasteners used to install prior conventional air curtain assemblies, since the air curtain assembly 36 is part of the modular side garnish molding assembly 10 of the present invention.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A side garnish molding assembly for use in a motor vehicle comprising:
an inner panel, an outer panel and a partition extending between and integral with said inner and outer panels;
an air curtain cavity defined by said partition in combination with said inner and outer panels;
at least one deployable air curtain disposed within said air curtain cavity;
a plurality of longitudinally spaced flanges integral with and extending away from said inner panel; and
a plurality of clips having a like number as said plurality of flanges, each of said clips having an open end in contacting, clamping engagement with one of said flanges, each of said clips having an opposite end adapted for insertion through a mating aperture formed in a structure of the motor vehicle.

2. An assembly as recited in claim 1, wherein:
said inner panel includes a substrate and a cover integral with said substrate;
said cover faces an interior of the motor vehicle when said assembly is installed in the motor vehicle.

3. An assembly as recited in claim 1, further comprising:
a head-impact-countermeasure cavity disposed above said air curtain cavity, said head-impact-countermeasure cavity being defined by said partition in combination with said inner and outer panels.

4. An assembly as recited in claim 1, wherein:
said inner panel comprises a substrate, said substrate of said inner panel, said outer panel and said partition being made as a unitary construction;
said assembly further comprises a plurality of longitudinally spaced mount hooks integral with said outer panel, said mount hooks being adapted for receiving mating hooks of a structure of the motor vehicle.

5. A side garnish molding assembly for use in a motor vehicle comprising:
an inner panel having a substrate;
an outer panel;
a partition extending between and integral with said inner and outer panels, said substrate of said inner panel, said outer panel and said partition being formed as a unitary construction;
an upper, head-impact-countermeasure cavity and a separate, lower, air curtain cavity, said head-impact-countermeasure cavity and said air curtain cavity being defined by said partition in combination with said inner and outer panels; and
at least one deployable air curtain disposed within said lower air curtain cavity.

6. An assembly as recited in claim 5, wherein:
said inner panel includes at least one deployment portion, each said deployment portion being generally aligned with one of said at least one deployable air curtains, said at least one deployment portion of said inner panel being operably effective for pivoting open away from said outer panel when a corresponding one of said air curtains is deployed.

7. An assembly as recited in claim 5, further comprising:
a plurality of longitudinally spaced mount hooks integral with said outer panel, said mount hooks being operably effective for receiving mating hooks of a structure of the motor vehicle.

8. A side garnish molding assembly for use in a motor vehicle comprising:
an inner panel including an upper portion and a lower portion;
an outer panel;
a partition extending between and integral with said inner and outer panel;
an upper, head-impact-countermeasure cavity and a lower air curtain cavity, said upper and lower cavities being defined by said partition in combination with said inner and outer panels;
an air curtain assembly disposed within said lower air curtain cavity, said air curtain assembly including at least one deployable air curtain;
said inner panel including at least one deployment portion, each said deployment portion being generally aligned with one of said at least one deployable air curtains, said at least one deployment portion of said inner panel being operably effective for pivoting open away from said outer panel when a corresponding one of said air curtains is deployed, said outer panel being integral with said upper portion of said inner panel and in contacting engagement with said lower portion of said inner panel when said air curtain is stowed and not deployed, said outer panel being otherwise spaced apart from said inner panel;
a plurality of longitudinally spaced and upwardly extending flanges integral with said upper portion of said inner panel, said flanges being spaced apart from said outer panel toward an upper edge of said inner panel; and
a plurality of clips having a like number as said plurality of flanges, each of said clips having an open end in contacting, clamping engagement with one of said flanges, each of said clips having an opposite, substantially closed end operably effective for being inserted through a mating aperture formed in a sheet metal structure of the motor vehicle.

9. An assembly as recited in claim 6, wherein:
each said deployment portion includes an upper, proximal side, a lower, distal side, and first and second ends longitudinally spaced from one another; and
said proximal side of said deployment portion is hingedly connected to an adjacent portion of said inner panel via a hinge.

10. An assembly as recited in claim 9, wherein:
said hinge is a living hinge.

11. An assembly as recited in claim 9, wherein:
said distal side of each of said deployment portions of said inner panel terminates in a hook; and
said outer panel includes at least one deployment portion aligned with said at least one deployment portion of said inner panel, each said deployment portion of said outer panel having a distal side terminating in an outwardly extending flange, said flange being in contacting engagement with a corresponding one of said hooks when said at least one air curtain is in a stowed position.

12. An assembly as recited in claim 5, further comprising:
at least one bushing extending between and integral with said inner and outer panels, said at least one bushing having a bore formed therein; and
at least one plug, said at least one plug having a shank portion shaped for engagement with said bore of said at least one bushing;
said plug including an interior bore extending partially therethrough and terminating in a land, said land being operably effective for receiving a head of a conventional fastener when said assembly is secured to the motor vehicle.

13. An assembly as recited in claim 5, wherein:
said outer panel includes at least one access door to facilitate inserting said at least one deployable air curtain within said lower air curtain cavity.

14. A method of installing a side garnish molding assembly for use in a motor vehicle comprising the steps of:
hooking a portion of the molding assembly onto a metal structure of the vehicle;
rotating an upper portion of the molding assembly toward a roof of the motor vehicle;
clipping an upper portion of the molding assembly to the metal structure of the motor vehicle.

15. An assembly as recited in claim 1, wherein:
said opposite end of each of said clips is resilient to facilitate insertion into a mating aperture of a structure of the motor vehicle.

16. An assembly as recited in claim 5, wherein:
said substrate of said inner panel, said outer panel and said partition are made of a thermoplastic material.

17. An assembly as recited in claim 5, wherein:
said substrate of said inner panel, said outer panel and said partition are formed by a blow molding process.

18. An assembly as recited in claim 5, wherein:
said substrate of said inner panel, said outer panel and said partition are formed by an injection molding process.

19. An assembly as recited in claim 5, wherein:
said inner panel, said outer panel and said partition extend longitudinally from a front portion of the motor vehicle to a rear portion of the motor vehicle and are disposed above a front side window and a second row side window during normal usage.

* * * * *